US011949190B2

(12) United States Patent
Chung et al.

(10) Patent No.: US 11,949,190 B2
(45) Date of Patent: Apr. 2, 2024

(54) ELECTRICAL CONNECTOR

(71) Applicants: FOXCONN (KUNSHAN) COMPUTER CONNECTOR CO., LTD., Kunshan (CN); FOXCONN INTERCONNECT TECHNOLOGY LIMITED, Grand Cayman (KY)

(72) Inventors: Chih-Ping Chung, New Taipei (TW); Chun-Hsiung Hsu, New Taipei (TW); Kuei-Chung Tsai, New Taipei (TW)

(73) Assignees: FOXCONN (KUNSHAN) COMPUTER CONNECTOR CO., LTD., Kunshan (CN); FOXCONN INTERCONNECT TECHNOLOGY LIMITED, Grand Cayman (KY)

( * ) Notice: Subject to any disclaimer, the term of this patent is extended or adjusted under 35 U.S.C. 154(b) by 202 days.

(21) Appl. No.: 17/525,051

(22) Filed: Nov. 12, 2021

(65) Prior Publication Data

US 2022/0158388 A1 May 19, 2022

(30) Foreign Application Priority Data

Nov. 13, 2020 (CN) ......................... 202011267821.3

(51) Int. Cl.

*H01R 13/64* (2006.01)
*H01R 13/405* (2006.01)
*H01R 13/6474* (2011.01)

(52) U.S. Cl.

CPC ....... *H01R 13/6474* (2013.01); *H01R 13/405* (2013.01)

(58) Field of Classification Search

CPC .............. H01R 13/6474; H01R 13/405; H01R 12/724; H01R 13/6477; H01R 13/6471; H01R 13/6473; H01R 13/02; H01R 13/502; H01R 13/648

See application file for complete search history.

(56) References Cited

U.S. PATENT DOCUMENTS

| | | | | |
|---|---|---|---|---|
| 7,727,028 | B1 * | 6/2010 | Zhang | H01R 12/716 439/108 |
| 8,764,464 | B2 | 7/2014 | Buck et al. | |
| 9,083,130 | B2 | 7/2015 | Casher et al. | |
| 10,574,002 | B1 * | 2/2020 | Henry | H01R 13/405 |
| 2012/0214351 | A1 * | 8/2012 | Shiratori | H01R 13/6581 439/692 |
| 2015/0140866 | A1 * | 5/2015 | Tsai | H01R 12/724 439/637 |
| 2016/0211629 | A1 * | 7/2016 | Phillips | H01R 13/6471 |
| 2019/0165518 | A1 * | 5/2019 | Hsu | H01R 13/6471 |
| 2020/0395698 | A1 * | 12/2020 | Hou | H01R 13/405 |

* cited by examiner

*Primary Examiner* — Truc T Nguyen
(74) *Attorney, Agent, or Firm* — Ming Chieh Chang

(57) ABSTRACT

An electrical connector includes: an insulating body; and a first row of terminals and a second row of terminals housed in the insulating body, each terminal in the first row of terminals having a tail portion, a contact portion, and a body portion, the first row of terminals including a signal terminal pair having a pair of signal terminals and a ground terminal arranged on one side of the signal terminal pair, wherein a first center distance between the contact portions of the signal terminal pair is different from a second center distance between the contact portion of the ground terminal and the contact portion of an adjacent signal terminal.

5 Claims, 13 Drawing Sheets

ELECTRICAL CONNECTOR

BACKGROUND OF THE INVENTION

1. Field of the Invention

The present invention relates generally to an electrical connector, and more particularly to an electrical connector suitable for transmitting high-speed signals.

2. Description of Related Arts

U.S. Pat. No. 8,764,464 discloses an electrical connector comprising a plurality of terminals, the terminals include at least one signal terminal pair and a ground terminals arranged on both sides of the signal terminal pair, in this electrical connector, a ground coupling component needs to be electrically connected to the ground terminal to adjust the performance of the electrical connector as required. However, the ground coupling component makes the composition of the electrical connector complex, which not only complicates the assembly, but also increases the cost of the electrical connector.

An improved electrical connector is desired.

SUMMARY OF THE INVENTION

A main object of the present invention is to provide an electrical connector capable of transmitting high-speed signals.

To achieve the above-mentioned object, an electrical connector that can be mated with a mating connector comprises: an insulating body; and a first row of terminals and a second row of terminals housed in the insulating body, each terminal in the first row of terminals having a tail portion, a contact portion, and a body portion, the first row of terminals including a signal terminal pair having a pair of signal terminals and a ground terminal arranged on one side of the signal terminal pair, wherein a first center distance between the contact portions of the signal terminal pair is different from a second center distance between the contact portion of the ground terminal and the contact portion of an adjacent signal terminal.

Compared to the prior art, in the electrical connector of the present invention, the second center distance is smaller than the first center distance in order to meet characteristic impedance requirement of high-speed signal transmission, thereby facilitating the transmission of high-speed signals.

DETAILED DESCRIPTION OF THE PREFERRED EMBODIMENT

Figure 1:
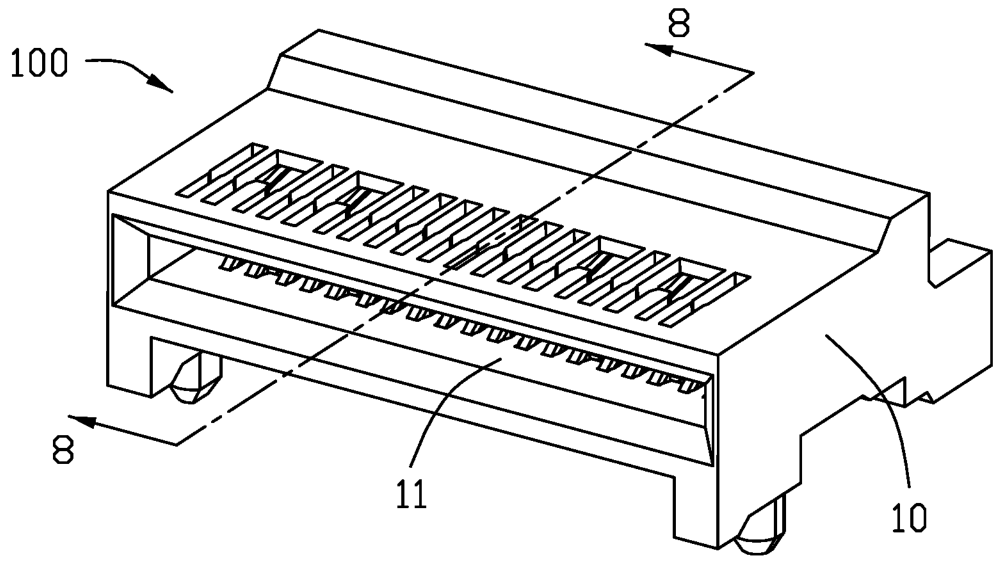
FIG. 1 is a perspective view of an electrical connector in accordance with the present invention.
Figure 2:
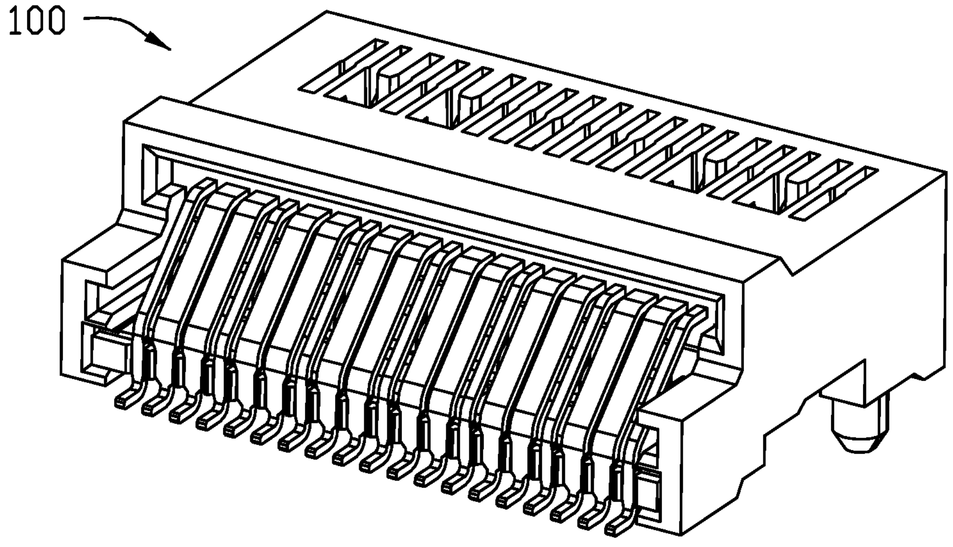
FIG. 2 is another perspective view of the electrical connector in FIG. 1.
Figure 3:
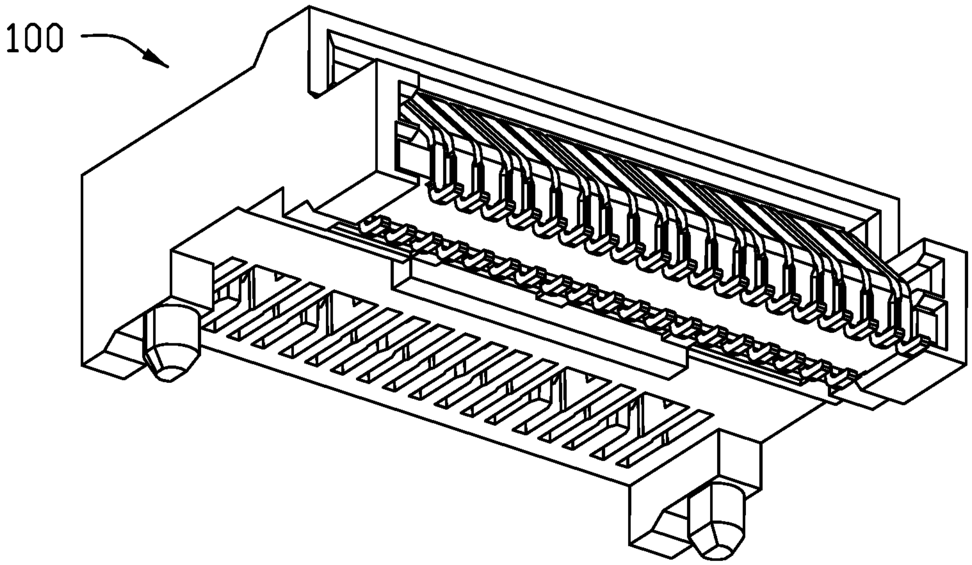
FIG. 3 is another perspective view of the electrical connector in FIG. 2.
Figure 4:
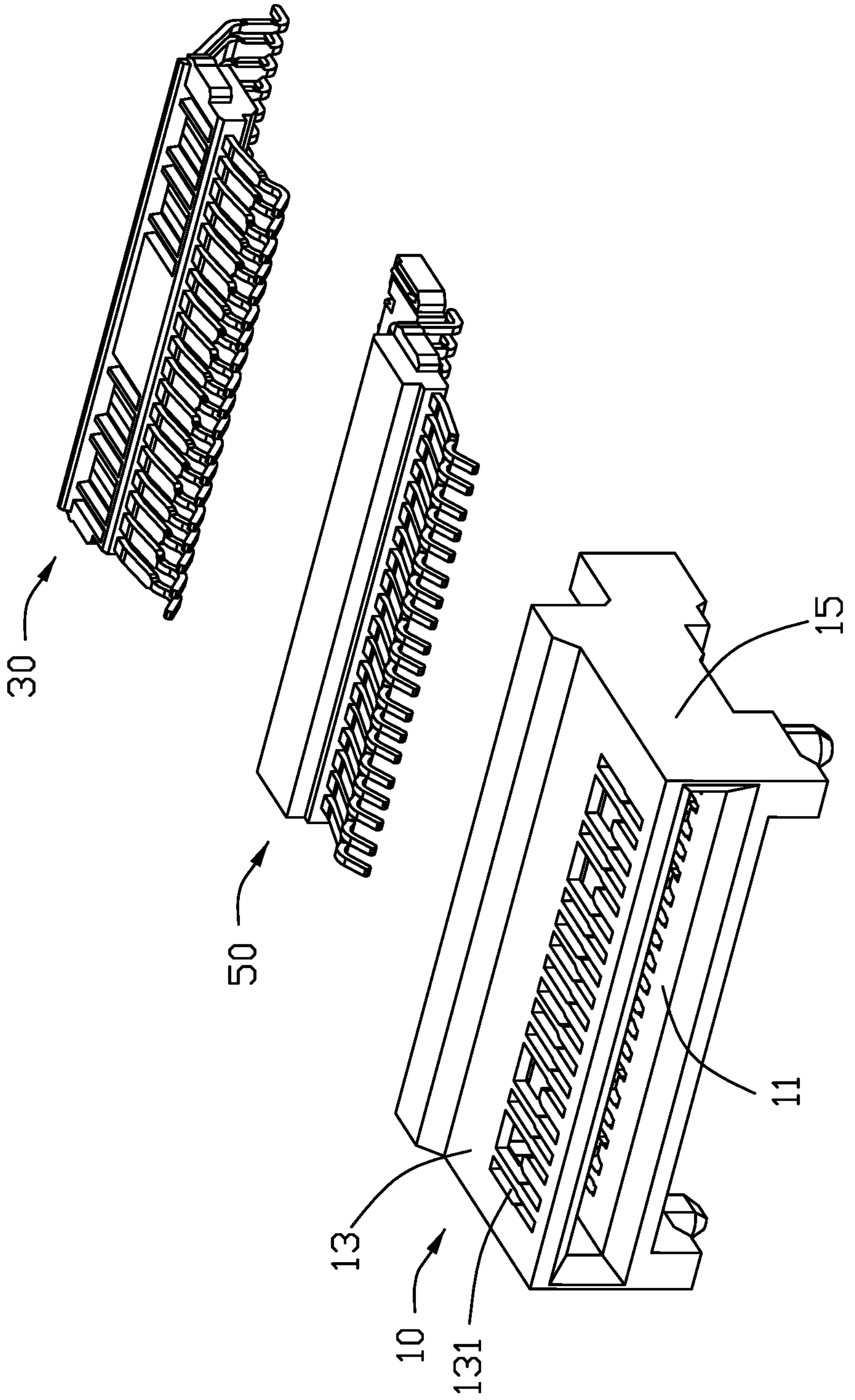
FIG. 4 is a partial exploded view of the electrical connector in FIG. 2.
Figure 5:
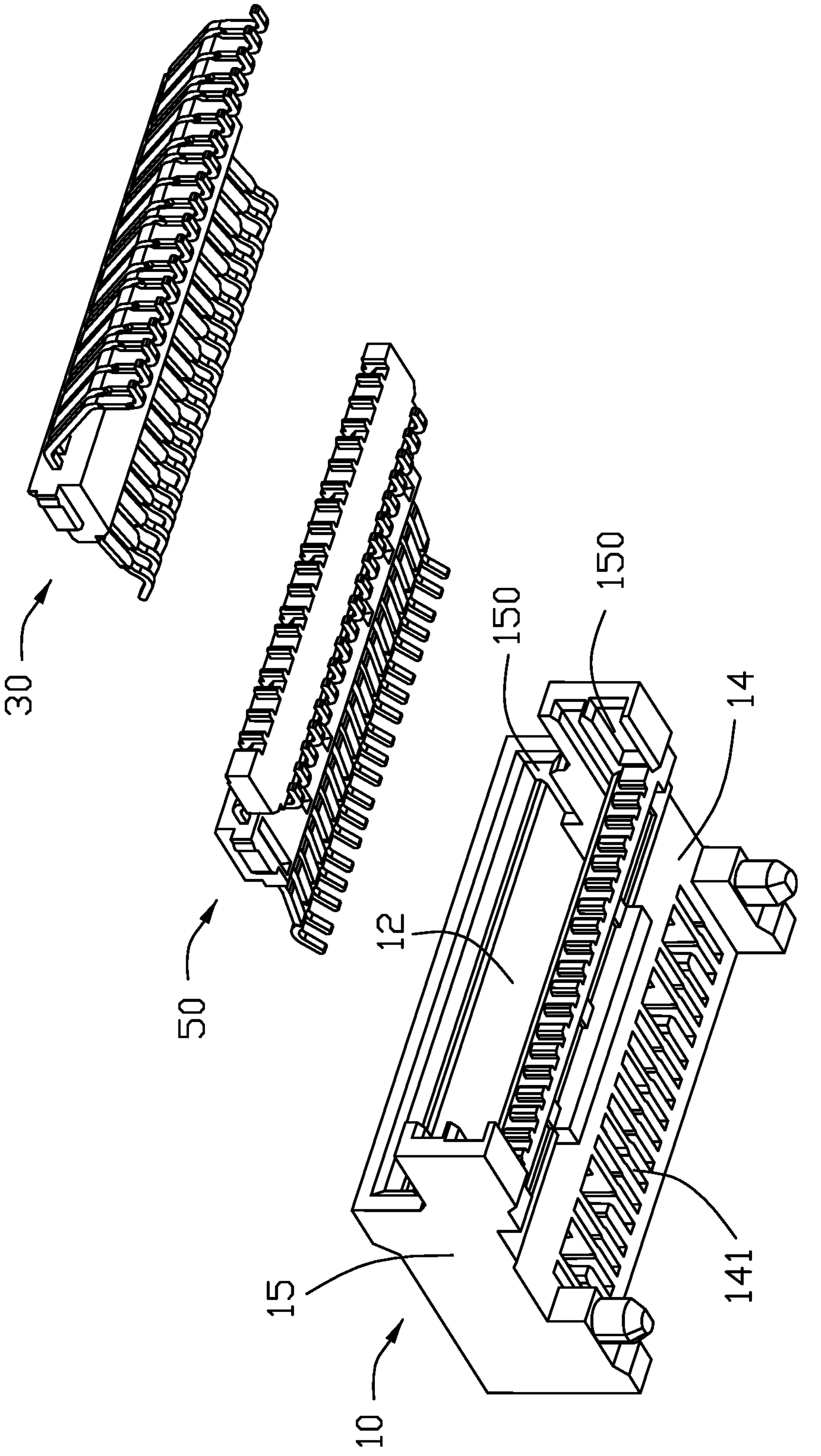
FIG. 5 is another partial exploded view of the electrical connector in FIG. 4.
Figure 6:
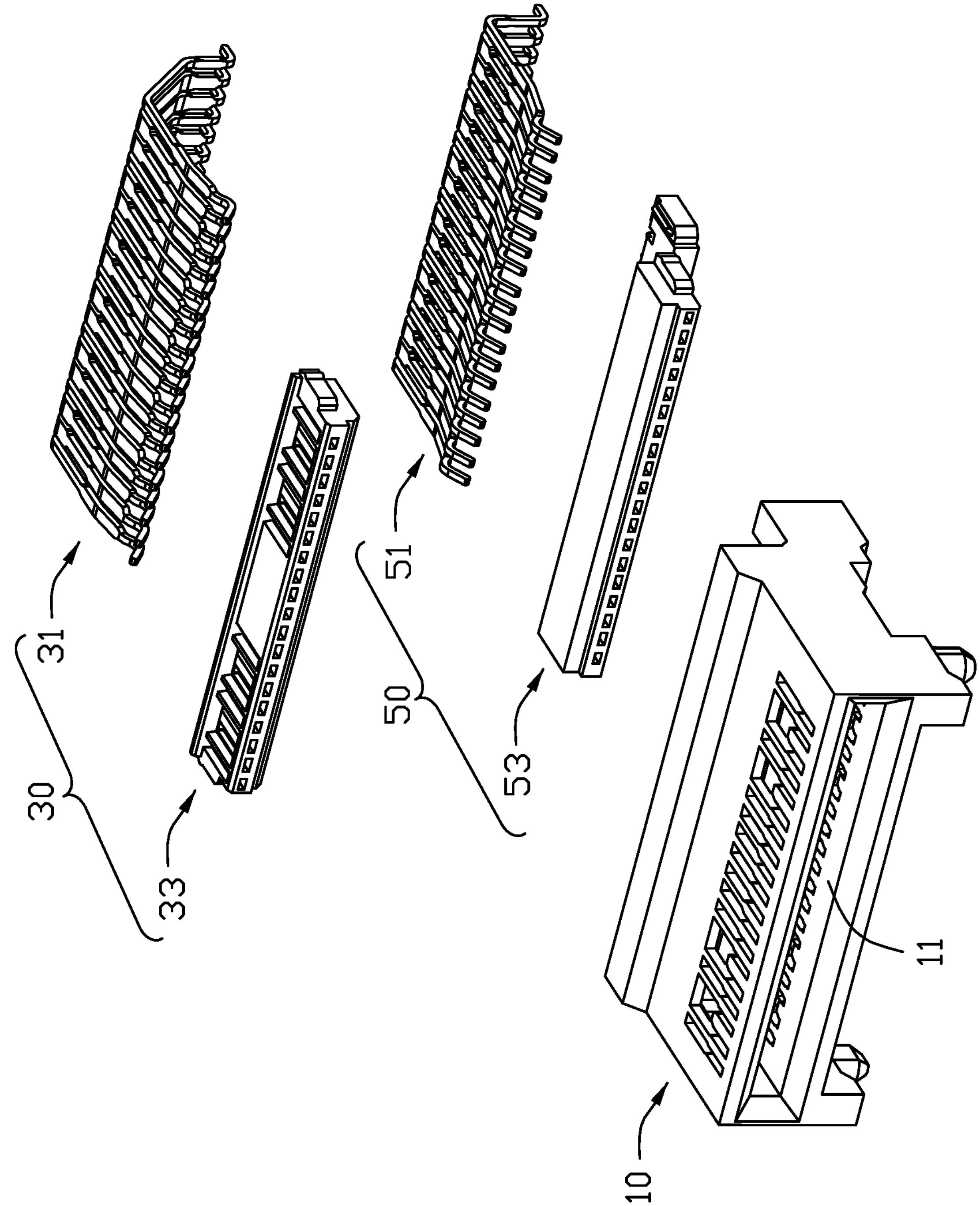
FIG. 6 is a further exploded view of the electrical connector in FIG. 4.
Figure 7:
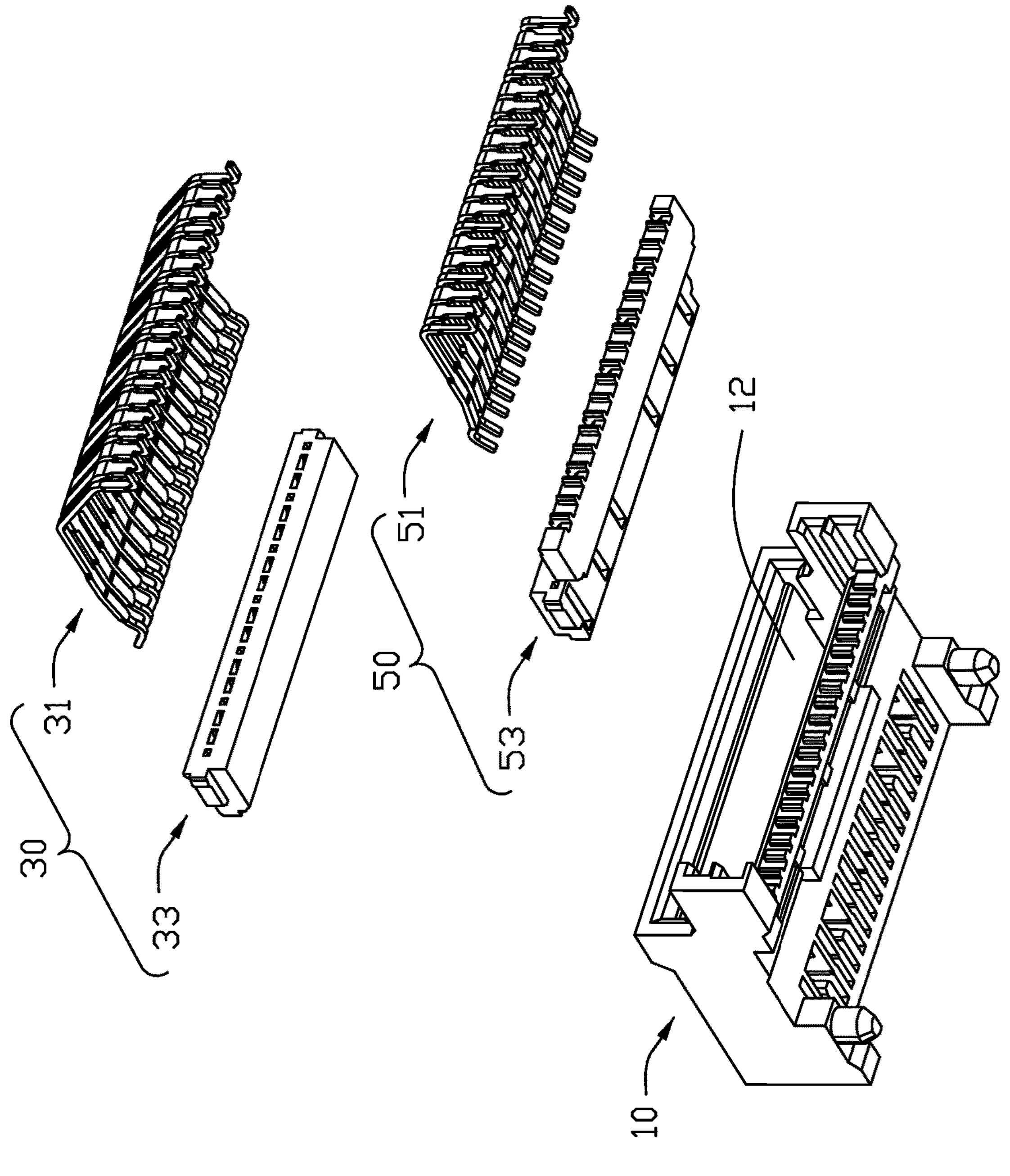
FIG. 7 is a further exploded view of the electrical connector in FIG. 5.
Figure 8:
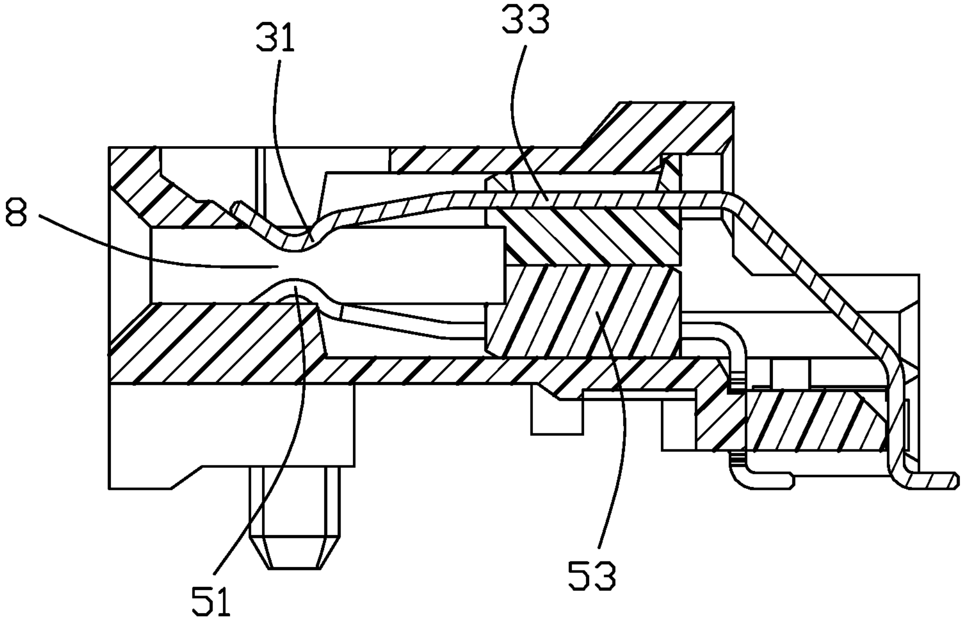
FIG. 8 is a cross-sectional view along line 8-8 of the electrical connector in FIG. 1.
Figure 9:
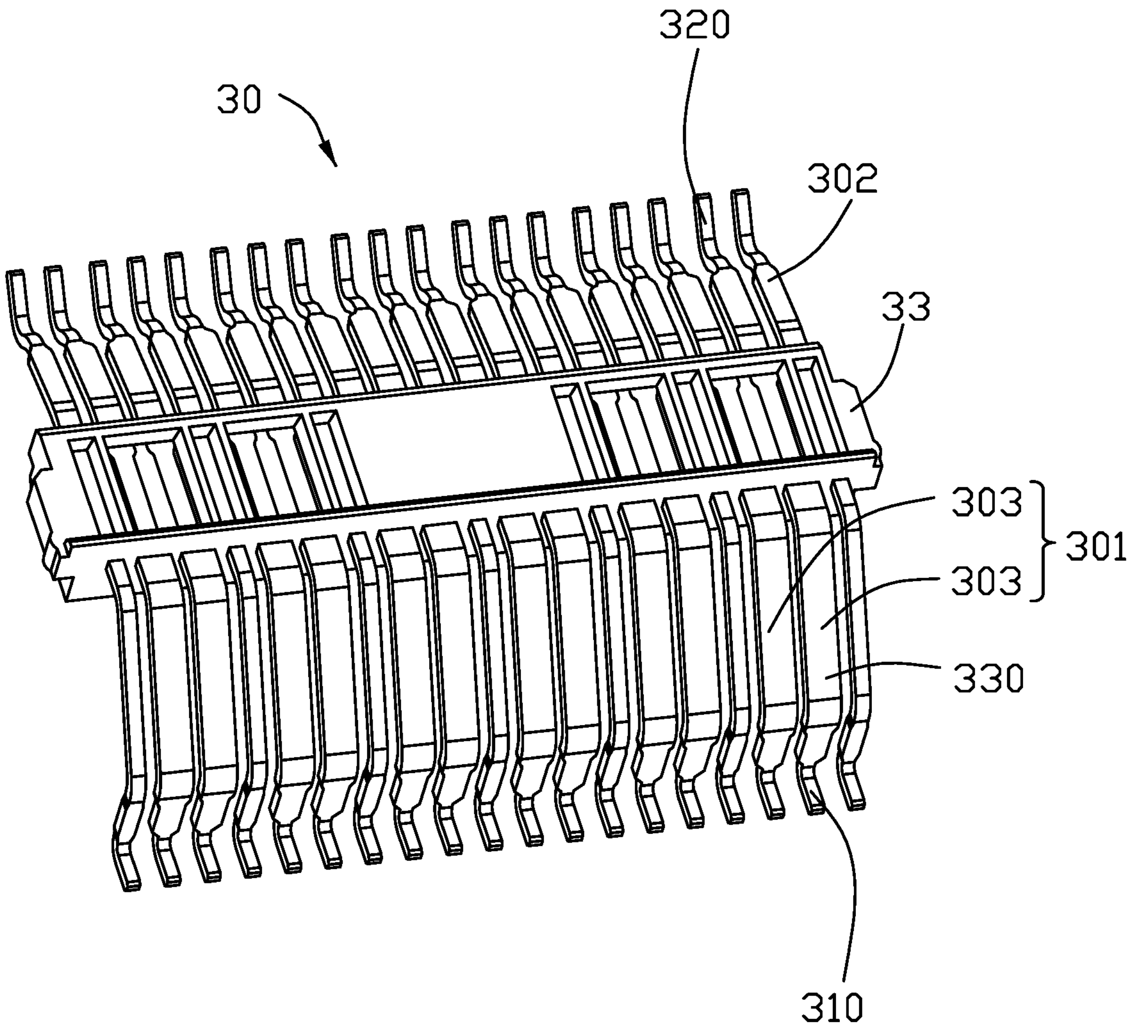
FIG. 9 is a perspective view of the first terminal assembly of the electrical connector in FIG. 1.
Figure 10:
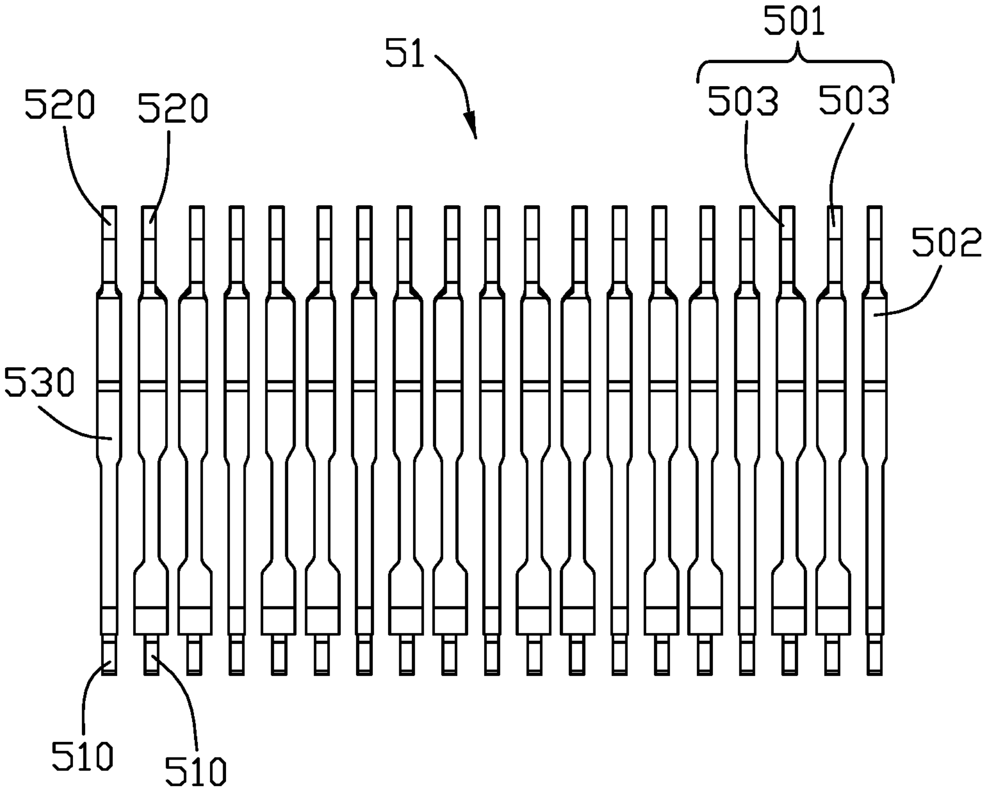
FIG. 10 is the front view of the first row of terminals of the electrical connector in FIG. 9.
Figure 11:
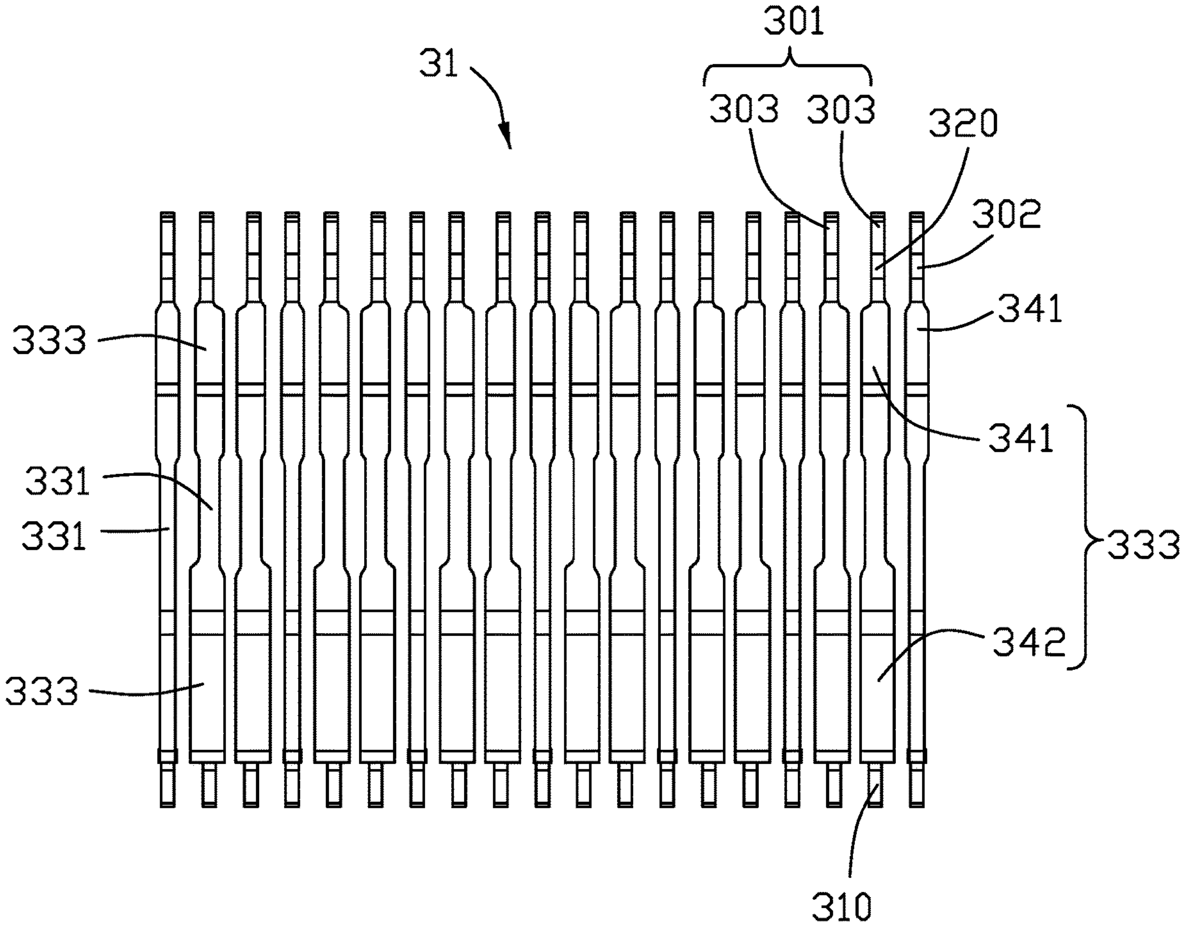
FIG. 11 is the front view of the second row of terminals in FIG. 9.
Figure 12:
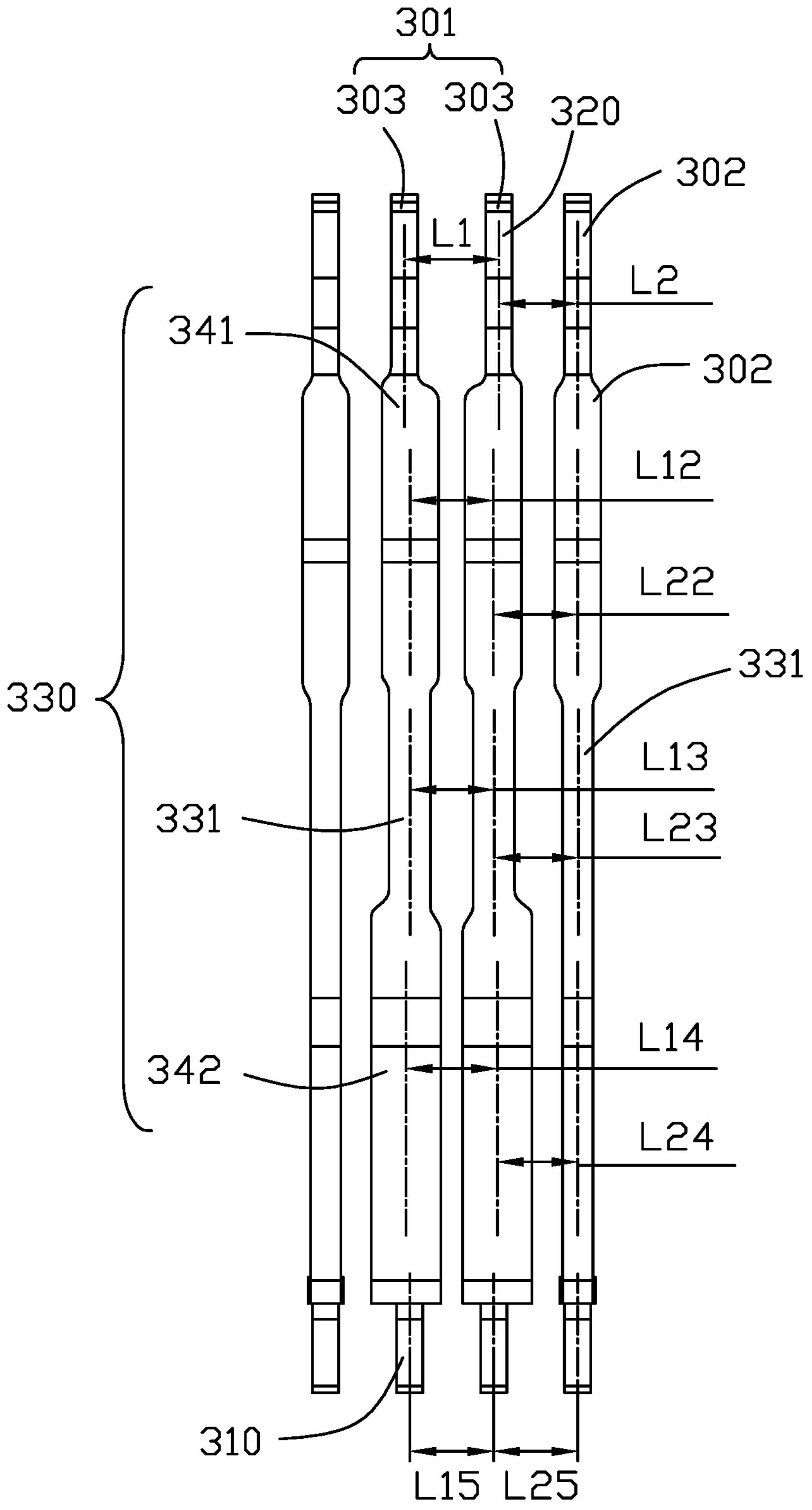
FIG. 12 is a partial enlarged view of the first row of terminals in FIG. 10.
Figure 13:
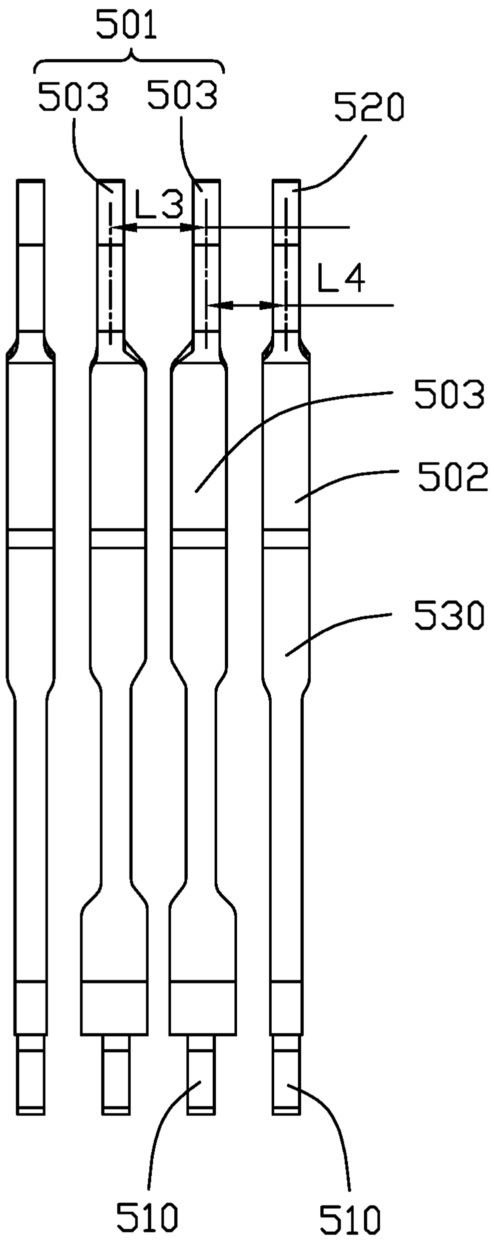
FIG. 13 is a partial enlarged view of the second row of terminals in FIG. 11.

FIGS. 1-13 show an electrical connector 100 of the present invention which can be mated with a mating connector. The electrical connector 100 includes an insulating body 10 and a first terminal group 30 and a second terminal group 50 arranged in the insulating body 10. The first terminal group 30 and the second terminal group 50 are stacked on each other in the vertical direction.

The insulating body 10 includes a mating port 11 for inserting the mating connector (not shown), an installation port 12 communicating with the mating port 11, and a top wall 13 arranged in parallel with the insertion direction of the mating connector, a bottom wall 14 arranged parallel to the top wall 13, and two side walls 15 connecting the top wall 13 and the bottom wall 1. The top wall 13 is provided with a plurality of upper through grooves 131 penetrating through the top wall 13. The bottom wall 14 is provided with a plurality of lower through grooves 14 penetrating through the bottom wall 14. The insulating body 10 is provided with a pair of installation grooves 150. In this embodiment, the pair of installation grooves 150 are respectively provided on the two side walls 15. The first terminal group 30 and the second terminal group 50 are installed in the mounting port 12 and are respectively located on opposite sides of the mating port 11.

The first terminal group 30 includes a first row of terminals 31 arranged in the left-right direction and a first fixing member 33 for fixing the first row of terminals 31. The first fixing member 33 is integrally formed with the first row of terminals 31, thereby fixing the first row of terminals 31 as a whole. The first row of terminals 31 includes a signal terminal pair 301 capable of transmitting differential signals and a ground terminal 302 provided on one side of the signal terminal pair 301. In this embodiment, the ground terminal 302 and the signal terminal pair 301 are arranged at intervals. The signal terminal pair 301 includes a pair of signal terminals 303, each terminal in the first row of terminals 31 includes a tail portion 310, a contact portion 320 mated with the mating connector, and a body portion 330 located between the tail portion 310 and the contact portion 320.

The first fixing member 33 is formed on the body portion 330 of each terminal of the first row of terminals 31 in the lateral direction. The body portion 330 includes a fixed portion 331 provided in the first fixing member 33 and a free portion 333 exposed to air. The fixed portion 331 of the ground terminal 302 and the corresponding fixed portion 331 of the signal terminal 303 are aligned in the left-right direction. The width of the free portion 333 of the signal terminal 303 is greater than the width of the fixed portion 331 of the signal terminal 303. The free portion 333 includes a first free portion 341 located between the contact portion 320 and the fixed portion 331 and a second free portion 342 located between the fixed portion 331 and the tail portion 310. The center distance between the signal terminal pair 301 varies from the contact portion 320 to the tail portion 310 as follows: the contact portions 320 of the signal terminal pair 301 have a first center distance L1, the center distance L12 between the first free portions 341 is less than the first center distance L1, and the center distance L13 between the fixed portions 331 is greater than the center distance L12 between the first free portions 341, the center distance L14 between the second free portions 342 is greater than the center distance L13 between the fixed portions 331, and the center distance L15 between the tail portions 310 is less than the center distance L14 between the second free portions 342. The center distance L15 between the tail portions 310 is equal to the center distance of the fixed portion 331. The first center distance L1 between the contact portions 320 is the largest. The center distance of the first free portion 341 of the signal terminal pair 301 is not equal to the center distance of the second free portion 342. Specifically, in this embodiment, the center distance L12 between the first free portions 341 of the signal terminal pair 301 is smaller than the center distance L14 between the second free portions 342

The center line C1 of each portion of the signal terminal 303 is not on a straight line, and the center line C2 of each portion of the ground terminal 302 is on the same straight line. There is a second center distance L2 between the signal terminal 303 and its adjacent ground terminal 302, and the second center distance L2 is not equal to the first center distance L1. Specifically, in this embodiment, the first center distance L1 is greater than the second center distance L2. In the fixed portion 331 of each terminal, the center distance between every two adjacent terminals is equal. That is, the center distance L13 between the fixed portions 331 of the signal terminal pair 301 is equal to the center distance L23 between the fixed portion 331 of the signal terminal 303 and the fixed portion 331 of the adjacent ground terminal 302. The center distance between the free portions 333 of the signal terminal pair 301 is not equal to the center distance between the ground terminal 302 and the free portion 333 of the signal terminal 303 adjacent thereto. Specifically, the center distance L12 between the first free portions 341 of the signal terminal pair 301 is smaller than the center distance L13 between the fixed portions 331, so that the center distance L22 of the first free portion 341 of the ground terminal 302 and the adjacent signal terminal 303 is greater than the center distance L23 between the ground terminal 302 and the fixed portion 331 of the signal terminal 303 adjacent thereto. Similarly, the center distance L14 is greater than the center distance L13, so that the center distance L24 between the ground terminal 302 and the second free portion 342 of the adjacent signal terminal 303 smaller than the center distance L23 between the ground terminal 302 and the fixed portion 331 of the signal terminal 303 adjacent thereto. The center distance L25 between the tail portion 301 of ground terminal 302 and the tail portion 310 of the adjacent signal terminal 303 is smaller than the center distance L24 between the second free portions 342 thereof. The center distance in the present invention refers to the distance between the center line of one terminal and the center line of the corresponding position of the other terminal.

The first fixing member 33 corresponding to the fixing portion 331 of the ground terminal 302 is partially removed, so that the fixing portion 331 of the ground terminal 302 is at least partially exposed to air in order to adjust the characteristic impedance of the terminal so that high-speed signals can be transmitted The second terminal group 50 includes a second row of terminals 51 arranged in the left-right direction and a second fixing member 53 for fixing the second row of terminals 51. The second terminal group 50 is similar to the first terminal group 30. The first row of terminals 31 of the first terminal group 30 and the second row of terminals 51 of the second terminal group 50 form a mating interface 8 for mating with a mating connector.

The second row of terminals 51 comprises a second signal terminal pair 501 capable of transmitting differential signals and a second ground terminal 502 arranged on one side of the second signal terminal pair 501. The second signal terminal pair 501 includes a pair of second signal terminals 503. Each terminal in the second row of terminals 51 includes a second tail portion 510, a second contact portion 520 mated with the mating connector, and a second body portion 530 located between the second tail portion 510 and the second contact portion 520. There is a third center distance L3 between the second contact portions 520 of the second signal terminal pair 501. There is a fourth center distance L4 between the second contact portion 520 of the second ground terminal 502 and the second contact portion 520 of the adjacent second signal terminal 503. The third center distance L3 is greater than the fourth center distance L4. The first center distance L1 is equal to the third center distance L3, and the second center distance L2 is equal to the fourth center distance L4. The change in the center distance of the second row of terminals 51 from the second contact portion 520 to the second tail portion 510 is the same as that of the first row of terminals 31.

The electrical connector of the present invention adjusts the characteristic impedance of the signal terminal by changing the center distance between the terminals, so that the impedance is matched when the terminal transmits signals, and the signal transmission rate of the connector is improved. In addition, the structure of the electrical connector is more compact, the assembly is simple and convenient, and the cost of the electrical connector is lower.

What is claimed is:

1. An electrical connector comprising:

an insulating body having a mating port for inserting a mating connector and an installation port communicating with the mating port;

a first row of terminals and a second row of terminals housed in the insulating body, the first row of terminals and the second row of terminals being installed in the installation port and respectively located on two opposite sides of the mating port, each terminal in the first row of terminals having a tail portion, a contact portion, and a body portion between the tail portion and the contact portion, the first row of terminals including:

a signal terminal pair capable of transmitting differential signals, the signal terminal pair including a pair of signal terminals; and a ground terminal arranged on one side of the signal terminal pair; and a first fixing member for fixing the first row of terminals, and wherein the body portion includes a fixed portion provided in the first fixing member and a free portion exposed to air, and a center distance of the fixed portions of the signal terminal pair is equal to a center distance of the tail portions thereof; wherein a first center distance between the contact portions of the signal terminal pair is greater than a second center distance between the contact portion of the ground terminal and the contact portion of an adjacent signal terminal;

a center distance of the fixed portions between every two adjacent terminals is constant, a center distance between the free portions of the signal terminal pair is different from a center distance between the free portion of the ground terminal and the free portion of the signal terminal adjacent thereto;

the free portion includes a first free portion located between the contact portion and the fixed portion and a second free portion located between the fixed portion and the tail portion, and a center distance of the first free portions of the signal terminal pair is smaller than a center distance of the second free portions thereof; and the center distance of the fixed portion of the signal terminal pair is greater than the center distance of the first free portions and smaller than the center distance of the second free portions.

2. The electrical connector as claimed in claim 1, wherein a width of the free portion of the signal terminal is greater than a width of the fixed portion.

3. The electrical connector as claimed in claim 1, wherein the fixed portion of the ground terminal is at least partially exposed to air.

4. The electrical connector as claimed in claim 1, wherein the second row of terminals includes a second signal terminal pair capable of transmitting differential signals and a second ground terminal arranged on one side of the second signal terminal pair, the second signal terminal pair includes a pair of second signal terminals, each terminal in the second row of terminals includes a second tail portion, a second contact portion, and a second body portion located between the second tail portion and the second contact portion, and a third center distance between the second contact portions of the second signal terminal pair is greater than a fourth center distance between the second ground terminal and its adjacent second signal terminal.

5. The electrical connector as claimed in claim 4, wherein the first center distance is equal to the third center distance, and the second center distance is equal to the fourth center distance.

* * * * *